Inventors
W. P. Mansfield
J. White

Sept. 1, 1953  W. P. MANSFIELD ET AL  2,650,472
RESONATING COMBUSTION POWER GAS GENERATOR
Filed Dec. 11, 1945  4 Sheets-Sheet 2

Inventors
W. P. Mansfield
J. White

Sept. 1, 1953   W. P. MANSFIELD ET AL   2,650,472
RESONATING COMBUSTION POWER GAS GENERATOR
Filed Dec. 11, 1945   4 Sheets-Sheet 3

Inventors
W. P. Mansfield
J. White
By Glascock Downing Seefeld
Attys.

Sept. 1, 1953  W. P. MANSFIELD ET AL  2,650,472
RESONATING COMBUSTION POWER GAS GENERATOR
Filed Dec. 11, 1945  4 Sheets-Sheet 4

Inventors
W. P. Mansfield
J. White
By Jasent Downing &c
Attys.

Patented Sept. 1, 1953

2,650,472

UNITED STATES PATENT OFFICE 2,650,472

RESONATING COMBUSTION POWER GAS GENERATOR

Wilfred Percival Mansfield and John White, Slough, England, assignors to Sir W. G. Armstrong Whitworth & Company (Engineers), Limited, London, England Application December 11, 1945, Serial No. 634,346
In Great Britain July 17, 1944

Section 1, Public Law 690, August 8, 1946
Patent expires July 17, 1964

10 Claims. (Cl. 60—39.28)

The invention relates to combustion products generators, and its object is to provide a simple generator of improved efficiency.

In known generators, either the mechanical construction is arranged to effect induction and compression of the fresh charge, as in reciprocating piston generators, or a separate machine is used for this purpose, as in gas turbine installations or jet propulsion units, where a turbine, actuated by the products of combustion, drives a compressor.

The present invention is applicable, inter alia, to all the above arrangements, but operates without the provision of a separate compressor. Compression of the fresh charge, to a value higher than that obtainable with existing compressors, ensures favourable conditions for good combustion, and this, coupled with a reduction in the number of changes in the form of the energy and a minimum of radiation losses, ensures high thermal efficiency of the generator.

The invention consists in a combustion products generator for producing a supply of gases under pressure suitable for doing work comprises a combustion chamber provided with inlet valve means, carburettor or fuel injection means of their equivalent, and if desired ignition means, a wave duct in extension of the combustion chamber for receiving the products of explosive combustion and through which the wave of condensation initiated by the explosion is propagated whereby both the gases and the wave travel at their separate velocities longitudinally of the duct away from the combustion chamber, means for reflecting the wave of condensation firstly as a wave of rarefaction situated at such a distance along the duct from the combustion chamber that said rarefaction is returned to the combustion chamber when the pressure therein has fallen to a value such that said rarefaction causes or assists induction of fresh charge into the combustion chamber, means for reflecting the wave of condensation subsequently as a wave of condensation situated at such greater distaance along the duct from the combustion chamber that said condensation reaches the combustion chamber after the period necessary to permit a completion of said induction of fresh charge in the combustion chamber preparatory to explosive combustion therein, and means for leading away the products of combustion from the duct to store or utilise the energy contained therein for doing work.

Except for the inlet valve means, movement is confined to the energy contained in the gases and to the gases themselves. Only the valve and fuel injection means need be cooled, and the remainder of the generator can be insulated against the loss of heat and to protect the structure of the generator when high temperature gases are used. This elimination of heat loss to the walls, as compared with conventional internal combustion engines, results in a considerable improvement in thermal efficiency.

Hereinafter a wave of condensation rising above the ambient pressure will be referred to as a positive wave and a wave of rarefaction falling below the ambient pressure will be referred to as a negative wave.

The behaviour of solitary moving waves described in the present specification is in accordance with the laws of such occurrences, and being well understood in the art will not be described herein.

Operation of the generator may be started by any means which initiates a relatively sudden rise of pressure in the combustion chamber. One suitable expedient is the detonation of a cartridge containing a small quantity of explosive.

As the pressure rises in the combustion chamber, a solitary steep fronted pressure wave is formed which is propagated outwardly from the combustion chamber along the wave duct. Rapid combustion is preferred, such as would be termed detonation in an internal combustion engine. As there are no moving working parts, rapid pressure rise is not detrimental. Rapid combustion ensures a steep fronted wave, of minimum length for a given volume, due to the high pressure or intensity of the wave while in the combustion chamber and inner end of the wave duct, and also a relatively steep and clearly defined tail to the wave. The maximum pressure of the wave is dependent upon the maximum combustion pressure. All the characteristics of the wave may be modified by arrangement of the form or shape of the wave duct, so that gases of the desired quantity (mass), temperature, pressure, and velocity, can be discharged therefrom as the working medium for the driven unit.

When combustion is completed, and the tail of the wave is leaving the combustion chamber, the pressure therein will fall rapidly to the pressure of the medium through which the wave has moved, which should be substantially the ambient pressure. This is the low pressure or charging phase, and the length and general construction of the wave duct should be such that no positive reflections return to the combustion chamber and raise the pressure therein for the desired duration of this phase.

A negative reflection is arranged to reach the combustion chamber at this time, to effect or assist induction of the fresh charge through the inlet valve. When re-charging is completed, a positive reflection of the wave is arranged to return to the combustion chamber, thereby raising the pressure of the fresh charge, and while the latter is thus compressed, combustion is initiated, so that the cycle is repeated.

The said negative reflection is arranged to occur in all embodiments of the invention by permitting expansion of the gases by providing, (1) a duct of divergent form increasing in cross sectional area away from the combustion chamber, either continuously or in steps, (2) by providing an open end to the duct remote from the combustion chamber or (3) a combination of these. The positive reflection is arranged to occur by providing (1) a decrease of cross sectional area in the direction away from the combustion chamber, (2) a closed end or partially closed end to the duct or (3) a combination of these.

The negative reflection must occur before the positive reflection and therefore the divergence, steps, or open end must be situated nearer the combustion chamber than the increase in area, or the closed end.

The products of combustion are delivered to a point of utilisation or storage, such as a reservoir supplying a gas turbine, or any other rotary, reciprocating, or other machine or machines, operated by pressure gases, or to a jet for direct propulsion purposes.

Timing of the various events throughout the cycle and the frequency or number of cycles per unit time, is determined by the velocity of propagation of the wave and the length of the combustion chamber and wave duct.

After a few cycles, stable conditions will be reached, when the percentage of the total energy of the cycle passing out of the duct and equal to the energy put in in the form of fuel in each cycle will be substantially constant, and the compression and combustion pressure will also be substantially constant.

The total energy taking part in the cycle, is divided between that passing out of the wave duct to do external work, and that reflected from the end of the wave duct, which does work upon the fresh charge and thus takes part in the next cycle. The division between these two quantities is dependent upon the proportioning between the open and closed ends or their alternatives, while this factor, the form or shape of the wave duct, and the coefficient of reflection, must conform to the relationship between the compression pressure and the combustion pressure, so that the fresh charge is compressed to the degree necessary to ensure that, upon ignition or injection of fuel, the combustion pressure following combustion will reach the desired value in each cycle.

Tests have shown that the passing of a steep fronted solitary wave through a medium composed of two different gases, causes very little mixing of the gases, either during the passage of the wave or immediately thereafter. The presence of residual gases, or products of combustion, in the wave duct, will not detrimentally affect combustion in the combustion chamber, provided the latter has been substantially filled with fresh charge, prior to the arrival of the reflected pressure wave which effects compression. The low pressure residual gases, left in the combustion chamber by the outwardly moving pressure wave, will move along the wave duct due to the action of the negative wave and to the higher pressure of the fresh charge, and should be simultaneously replaced by fresh charge.

The fresh charge for the generator may be a carburetted mixture of fuel and air, or the charge may be air, with any suitable liquid, gaseous, or solid fuel injected prior to or during the compression phase. An ignition means may be used if desired, or the compression ignition or auto-ignition methods may be applied.

In known generators there are several conversions from pressure energy to mechanical energy and vice versa, each of which is accompanied by losses in energy and thus in efficiency, as, for example in the compressor and turbine. The compressor is particularly inefficient at very high discharge pressures. Similar considerations apply to internal combustion engines.

In the present invention the induction and compression operations are accomplished without any changes of pressure energy into mechanical energy or vice versa and the losses are limited to those which occur upon reflection and during motion of the gases, and are of a small order.

Thus the elimination of the compressor and the portion of the turbine which drives it, or in jet propulsion and similar applications the complete turbine, together with the reduction of heat losses by the insulation of the generator, ensure the achievement of higher thermal efficiencies than are obtained with existing generators.

Calculation of the behaviour of the gases in accordance with the present proposals, should be based upon the theory, and formulae derived therefrom, of moving waves of finite amplitude, and not upon steady flow or stationary waves.

The products of combustion discharged from the wave duct may be used to operate a gas turbine, or for jet propulsion.

Further features of the invention will be apparent from the description given hereafter.

The accompanying drawings illustrate several modes of carrying out the invention.

Practical applications of the invention will now be described by way of example only.

The combustion chamber may be of any desired shape, with a view to promoting the desired type of combustion. The inlet duct orifices and valves, at one end, and the wave duct at the other, should merge smoothly into the chamber, in order to avoid undesirable reflections and to facilitate recharging in the manner described.

The volume of the chamber is largely dependent upon the arrangement of the inlet orifices and auxiliary equipment, since there is no serious objection to the fresh charge occupying the inner end of the wave duct and combustion occurring therein, particularly as the wave duct is, in effect, an extension of the chamber, and there is no necessity for a clear demarcation between them.

The total volume of the combustion chamber plus wave duct must be related to the quantity of fuel burned, the combustion pressure, and the desired pressure of the gases to be discharged as the working medium.

In one embodiment of the invention there can be provided a substantially cylindrical combustion chamber of about 5 or 6 inches in diameter, a wave tube of the same diameter for a length of 3 or 4 feet continuing in a flared pipe, reaching a diameter of 15–18 inches in a further length of 15 feet and followed by a tail pipe of, say, 12 inches diameter and 6 feet long. This duct is on the lines of that illustrated in Figure 6. Alternatively, two pipes on the lines illustrated in Figure 3 can be used, in which the area of the closed and open ducts at the combustion chamber is equal, the open pipe having a divergence of the order given above and a length of 14 feet, with the closed pipe having a length of 19 feet. It is advantageous that the duct arranged to provide the positive or closed end reflection should be cylindrical and thus avoid the additional reflections that would occur in a tapered duct. Alternatively a twin duct of the type illustrated in Figure 7 can be used in which the total taper of the pipe is of the order given, with a length of 14 feet to the open end and 19 feet to the closed end. These dimensions are given purely as examples and are in no way to be taken as restricting the scope of the invention.

As already mentioned arrangements should be made for cooling the inlet orifices, valves, and auxiliary equipment, while the chamber and wave duct may be insulated internally against the loss of heat, and for the protection of the structure from heat stresses. Since there are no moving parts and no lubrication difficulties, the temperature of the internal walls of the structure may be as high as desired, and for the same reason complete freedom is available regarding the shape and form of the structure. The prevention or reduction of the heat losses through the walls, will effect a considerable increase in the thermal efficiency of the cycle.

Figure 1:
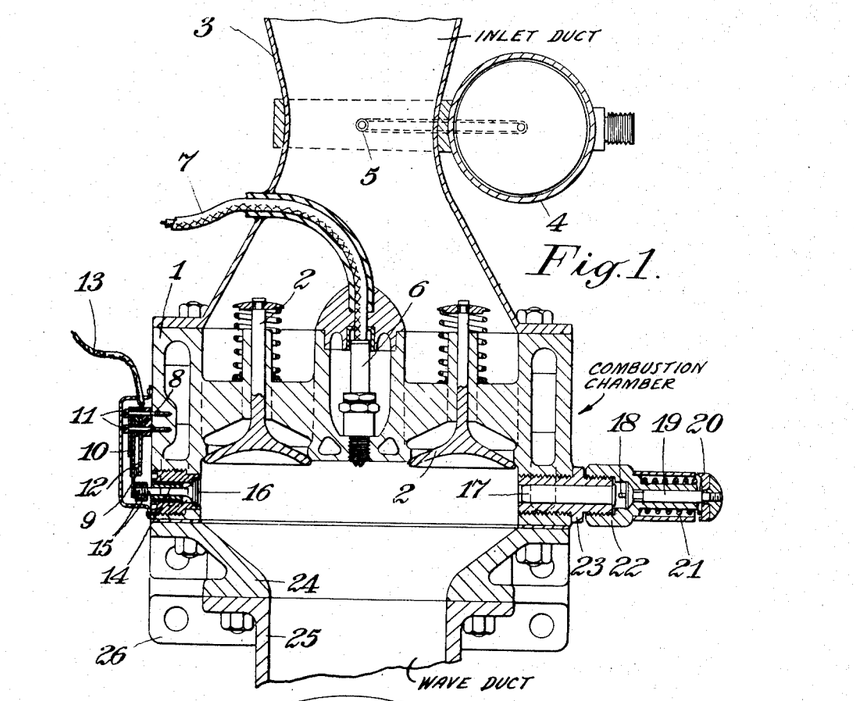
Figure 1 is a sectional elevation of one form of combustion chamber and its associated elements in accordance with the invention.

Figure 1 shows one form of combustion chamber with its associated elements. The end cover 1 carries four automatic inlet valves 2. The inlet duct 3 forms the venturi of a carburettor and is fitted with a float-chamber 4 and jet 5. A sparking plug 6 is located at the centre of the end cover and a suitably insulated lead 7 connects it to the high tension connection of a normal ignition coil. Periodic breaking of the low tension circuit in synchronism with the action of the gases in the tube is effected by the contact breaker 8. One of the two contact points 9 is carried by the largest of a set of leaf springs 10 which are connected electrically to earth by way of the screws 11. The other contact is carried by an insulated spring strip 12 which is connected by the cable 13 to the low tension coil, the other end of which is connected to the positive terminal of the battery while the negative of the battery is connected to earth.

During the low terminal pressure phase in the combustion chamber the leaf spring 10 lifts the small poppet valve like plunger 14 off its seat for a very short distance, determined by the setting of the lock-nuts 15. The head of the plunger moves in a recess 16 in which it always remains, the clearance round the plunger head being small so that little gas leakage occurs. When the plunger is lifted thus, the contacts 9 bear against one another. On the arrival of the front of the compression wave, the plunger is forced abruptly back onto its seat, breaking the contacts 9 and causing the passage of a spark at the sparking plug points.

Starting is effected by the detonation of a small charge of explosive contained in the cartridge 17. The striking pin 18 is formed on the head of a poppet like plunger 19 to which is attached the striker 20 designed to receive a sharp blow. After this operation, the gas pressure and the spring 21 return the plunger to its seat formed in the body 22 so that no gas leakage occurs. The body 22 is unscrewed from the cartridge holder 23 to permit the removal of the spent cartridge, and the insertion of a new one.

The portion 24 which connects the end cover 1 to the wave duct 25 is formed with a base 26 by means of which the unit may be attached to a suitable support or foundation in order to prevent movement of the unit due to the fluctuating gas pressure.

Figure 2:
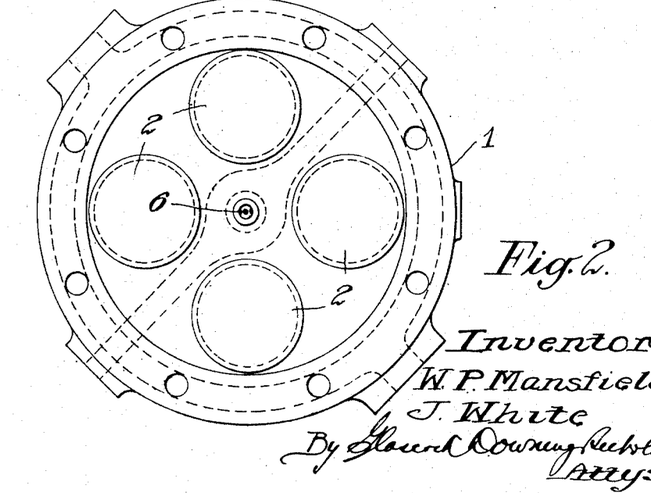
Figure 2 is a view of the inner side of the end cover shown in Figure 1.

Figure 2 is a view of the inner side of the end cover of the arrangement shown in Figure 1, showing the disposition of the four inlet valves and the sparking plug. A main water circuit and a separate passage for water-cooling the sparking plug are indicated by broken lines.

Figure 3:
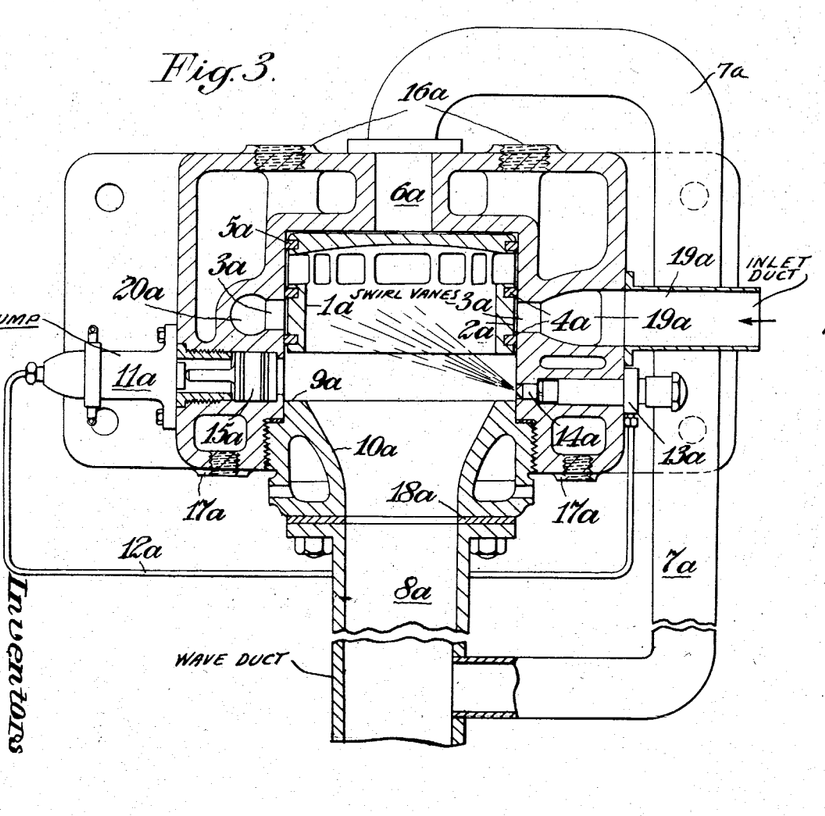
Figure 3 is a view showing the use of a piston type air valve opened and closed by gas pressure.

Figure 3 illustrates the use of a piston type air valve 1ª which is opened and closed by gas pressure.

In the position shown the air ports 2ª which are cut tangentially in known manner to induce swirl, are closed, and are sealed against high pressure by the piston rings 4ª. Another ring 5ª prevents escape of gas to the passage 6ª. In this position, fuel injection and combustion take place, ignition being by compression ignition or auto-ignition in this embodiment. When the wave front reaches that point in the main duct 8ª to which the auxiliary duct 7ª is connected preferably at right angles thereto by welding or other known means, part of the wave proceeds along the auxiliary duct and arriving at the piston valve at the time when the pressure in the combustion chamber has fallen to a low value, exerts a high pressure on the valve and effects a rapid opening in readiness for the ensuing induction action in which air is drawn in through the intake tube 19ª and the air belt 20ª which feeds all the air ports. On reaching the open position the piston is brought to rest by the stop 9ª formed by the screwed portion 10ª to which is attached the main duct 8ª. The ports in the piston are cut tangentially to match the ports 2ª and provide a well known arrangement for imparting swirl to the entering air. After the induction period is completed, the valve is closed by the front of the compression wave, the form of the wave duct being such as to produce a wave front which will give a suitable acceleration to the piston. The length of the auxiliary duct 7ª must be greater than the length of the main duct from the point of connection of the auxiliary duct to the cylinder end cover. In this way when the return compression wave reaches the junction the main portion of the wave which passes along the main duct, will reach and close the piston valve before the smaller portion of the wave which has travelled along the auxiliary duct can act upon the back face of the piston valve. Moreover combustion will be in progress so that a considerable rise in pressure will have occurred in the combustion chamber before the compression wave along the auxiliary duct has reached the piston valve.

The fuel injection pump 11$^a$ which supplies fuel through the injection pipe 12$^a$ to the nozzle holder 13$^a$ and injection nozzle 14$^a$ is actuated by the plunger 15$^a$ which is subjected to the pressure of the compression wave. The movement of this plunger is limited at both ends of its travel as shown. When the pressure in the combustion chamber falls, the plunger 15$^a$ returns to the inner position under the action of a spring contained in the pump 11$^a$.

Two water inlet connections 16$^a$ are provided to the water cooling jackets and two outlet connections 17$^a$.

The screwed portion 10$^a$ is similarly cooled. A heat insulating joint 18$^a$ is fitted between this portion and the uncooled duct 8$^a$.

The wave duct may be of any desired cross-sectional shape, provided it merges smoothly into the combustion chamber.

If a parallel duct is used and the open and closed ends are in the same plane, the negative and positive actions will occur substantially coincidently, with consequent reduction in the intensity of both actions, and incorrect timing of the arrival of the negative and positive waves in the combustion chamber so that this arrangement should not be used.

The duct may comprise two portions or two separate pipes of different length, each having the same cross-sectional area throughout their respective lengths, the shorter of the two having an open end to provide the negative reflection and the longer having a closed end to provide the positive reflection. Alternatively, the former may be of divergent form, the taper being constant or varying along the length of the duct, or it may be provided with steps, i. e. sudden enlargements of cross sectional area.

In the case where the open end duct has the same cross-sectional area throughout its length, when the tail end of the pressure wave leaves the combustion chamber, the pressure therein will be that of the medium through which the wave has moved, and the arrangement should be such that this is substantially the ambient pressure. Thereafter, a negative reflection of the pressure wave is propagated back from the open end of the duct, the latter being arranged to permit a suitable degree of expansion of the gases. The negative wave returns to the combustion chamber, and effects the induction of the fresh charge. This negative reflection should not reach the combustion chamber before the tail of the pressure wave has left, since, if it does so, it will reduce the pressure in the chamber, but the pressure will still be above the ambient and no induction of the charge will occur.

In the case where the duct is of divergent form, the pressure left behind the tail of the outwardly moving pressure wave, is a function of the pressure of the medium through which the wave has moved, and of the negative reflections from the divergent duct. These negative reflections are the result of the expansion permitted by the taper, and may be most simply described as the combined result of a very large number of very small steps in the duct. In this case also it is advantageous to ensure that, when the negative reflections reach the combustion chamber, they are able to effect induction of the fresh charge. This may be accomplished, by providing a duct of constant cross-sectional area, for a length substantially equal to half the length of the pressure wave. The negative reflections from the divergent duct will effect the induction of the fresh charge, but if the open end of the divergent duct permits expansion of the gases, the negative wave from the open end of the duct will be available, provided the gases are under pressure when they reach that point. The latter action will be of reduced intensity due to utilisation of energy at the divergent portion, but the combined effect of these two actions will ensure an adequate induction of fresh charge.

In the case where steps are provided in the duct, the sudden expansions of the gases at the steps, will cause negative waves to be propagated back to the combustion chamber, and arrangement of the distance between the chamber and any step will ensure that the negative actions reach the chamber at the desired time. The negative wave from the open end will again be available, if expansion of the gases is permitted, and although this action will be of reduced intensity, due to the expansion and to the energy liberated at the steps, the total or combined effect can be applied to the induction of the fresh charge.

With a divergent duct (see Figure 6) the negative reflections from the taper can be relied upon to effect induction of the fresh charge without assistance from the open end reflection, so that induction can be completed before the positive reflection from the closed end reaches the combustion chamber.

The distance to the positive reflecting surface of the duct must be greater than the distance to the point of negative reflection, so that the negative reflection reaches the chamber the required time before the positive reflection, to enable induction to be completed prior to compression.

For example, two separate wave ducts may be provided in extension of the combustion chamber, one fully open and the other fully closed, the cross-sectional area of each duct being arranged to give the desired proportion of negative and positive actions, while the length of each pipe gives the required timing of the actions. Both, either or neither of the ducts may be divergent.

Alternatively, a portion of a single duct may be extended to form the longer closed duct, with an internal web extending any desired distance towards the chamber, thus, dividing the duct into two portions, either or both of which may or may not be divergent.

As a further alternative, the central portion of the single duct may be extended to form the longer closed duct, whereby the open end becomes a ring of ports at the change of section. In this case also the closed duct may be extended inside the main duct for any desired distance towards the combustion chamber, with a view to maintaining the negative and positive actions separate for as long as required, and again, both, either, or neither may be divergent.

A number of representative forms of wave duct arranged as indicated above are shown in Figures 6 to 9 by way of example.

Figure 6:
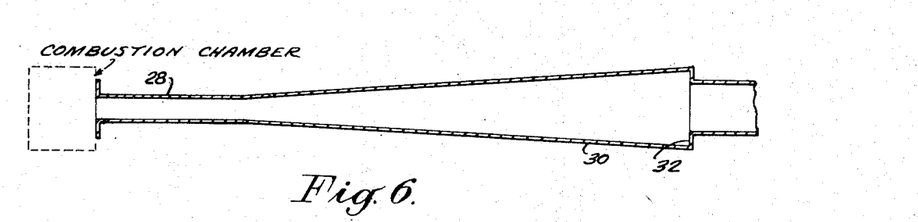
Figures 6 to 9 show various forms of wave duct.

Figure 6 shows a simple tapered duct, with a tailpipe carrying the gases to the turbine or other point of utilisation or storage. A portion 28 near the combustion chamber is of constant diameter, a portion 30 increases in diameter to provide a negative wave reflecting part, and a partial closure 32 provides a positive wave reflecting part.

Figure 7:
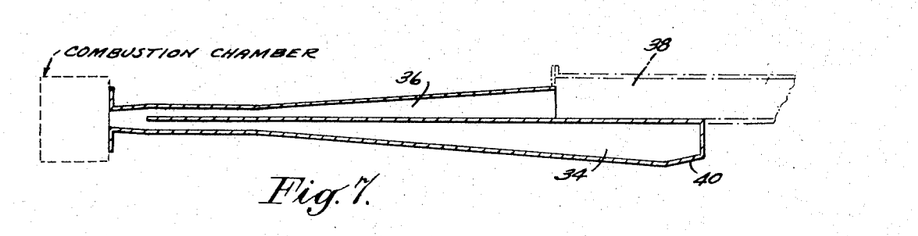

Figure 7 shows a divided wave duct in which the length of the closed end portion 34 is greater than the length of the open end portion 36 and a tailpipe 38 which permits expansion at the open end, and conveys the gases as defined above. A slight reverse taper 40 is shown at the closed end in order to cause a less intense wave front, for closing the valves or actuating the pressure sensitive means, than would be given by the complete surface normal to the wave duct.

Figure 8:
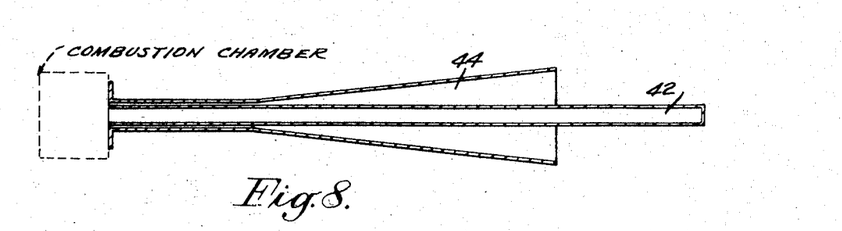

Figure 8 shows a duct in which the longer closed end portion 42 is not tapered, and is contained within the tapered open end portion 44.

Figure 9:
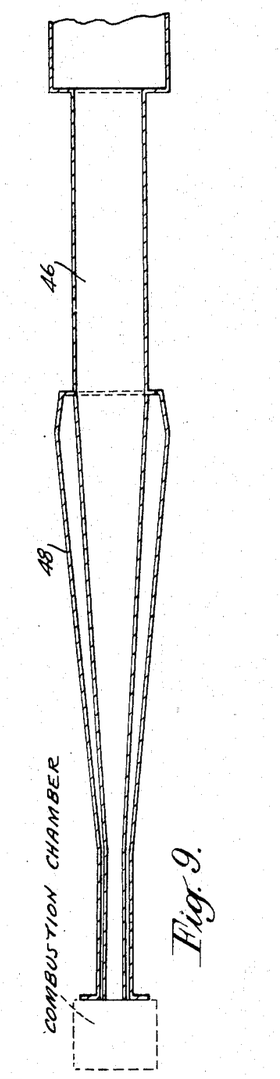

Figure 9 shows an arrangement wherein the open end portion 46 is contained within the closed end portion 48, both being tapered, and in which the open end portion is 1½ times the length of the pressure wave, so that the negative reflection from the open end arrives back at the combustion chamber at the beginning of the induction period of the next cycle. In this case also the tailpipe must permit expansion of the gases in order to permit a negative reflection. It will be appreciated that the combustion chamber indicated by the dotted rectangle in the figures may be of any of the forms described herein.

Any number and shape of ducts may be provided in extension of the combustion chamber, and provided the timing and frequency of action is co-related, gases at different pressures may be delivered from the various ducts.

At the outer end of the wave duct, gases at almost any desired pressure can be obtained by suitable design or arrangement of the amount of divergence, or the number and size of steps, provided in the said duct. In other words, the energy liberated by combustion, in passing along a duct having considerable divergence or numerous large steps, will be distributed throughout a low pressure wave containing a large volume of low pressure gas. Alternatively the said energy in passing along a duct having small divergence or a few relatively small steps, will be confined in a high pressure wave containing a small volume of high pressure gas. The temperature and velocity of discharge of the gases are governed by the amount of expansion allowed, that is the condition of the gases when they reach the outer end of the duct. The above consideration assume a constant quantity of energy, since an increase in the quantity of fuel burned would increase the total energy, the intensity and length of the wave, the volume of gas contained in the wave, and the velocity of propagation of the wave. An increase in the length of the duct would alter not only the timing of the various events comprising the cycle, and the number of cycles per unit time, but also the total volume or mass of gas taking part in the cycle, without altering the volume contained in the wave.

Thus the velocity of the wave, and the length of the duct, control the timing and frequency of the cycle. The arrangement of the duct to produce negative and positive reflections of the combustion wave controls the division of the total energy taking part in the cycle, between that passing out of the duct and that positively reflected. The degree of compression, is dependent upon the reflected energy, and must be such as to give, in conjunction with the supply of fuel, the desired combustion pressure, and intensity of the succeeding pressure wave.

It will be understood that references to the large or small proportions of the total energy being discharged through the open end, are relative to the total energy taking part in the cycle, and that once steady conditions are established, the energy discharged out of the open end on each cycle is the same, and is directly proportional to the energy input in the form of fuel.

The inner end of the combustion chamber is the seat of a double reflection, and combustion should be timed, or otherwise arranged, to occur while the fresh charge is under the influence of this action. For example the ignition and/or fuel injection means may be positioned at the back wall of the combustion chamber, i. e. furthest away from the wave duct, so that combustion can be initiated in this zone as soon as the returning pressure wave commences to be reflected. The nature of the solitary moving pressure wave is such that the returning pressure wave causes movement of fresh charge towards the said back wall of the combustion chamber, which movement persists even after combustion has commenced, and continues to move fresh charge towards the zone in which combustion is proceeding, so that the new combustion wave will synchronise, in effect, with the returning pressure wave, and will be superimposed upon it. The velocity of the wave is supersonic and is dependent upon its amplitude, so that no smaller actions can interfere with its propagation. As combustion proceeds, preferably in the form of detonation, the pressure front will move through the remaining unburnt fresh charge, and cause combustion of these gases as their pressure is suddenly raised.

If separate ducts are provided to produce the negative and positive actions, the arrangement should be such that as far as possible the returning positive wave does not pass into the other duct without being reflected and reversed at the end wall of the combustion chamber. The same considerations apply to the returning negative wave. For this reason, it is preferred that the two ducts should be connected to the combustion chamber by a single junction.

Although the main portion of the negative wave will pass out through the inlet orifice and inlet duct, and be positively reflected at the open end, another portion will be reflected and reversed at the inner end of the combustion chamber, but this latter action will be substantially completed before the reflected positive wave arrives. The positive wave will pass through this negative wave and, as combustion follows immediately, any detrimental effect of the reflected negative wave upon the desired function of the cycle will not be serious. The reflected negative wave, being of much lower intensity than the combustion pressure wave, will travel more slowly than the latter and will be overtaken by it, with a consequent small reduction in the pressure wave.

Residual waves, however, must be carefully controlled particularly so that they do not disturb the charging period. The combustion wave being of much higher intensity will swamp the residual effects.

An inlet duct may be provided in extension of the inlet valve, whereby, if the generator is installed in an aircraft or other moving machine, vehicle, ship, etc., advantage may be taken of the velocity head, due to the forward motion of the machine, to assist in re-charging the generator. If it is desired to impart swirl to the entering fresh charge, the inlet duct and/or valve means may be provided with deflectors, or be otherwise arranged for the purpose.

When the negative waves pass the inlet valve, they are propagated along the inlet duct and are reflected as positive waves at the open end. According to another feature of the invention the length of the inlet duct is made such that these waves assist induction, in that one positive wave is arranged to arrive at the inlet valve as the latter opens and another as it closes, i. e. their frequency is a multiple of the frequency of the waves in the combustion chamber and wave duct, and they have a period equal to the induction period.

The positive wave which reaches the valve as it opens, will assist in opening it and ensure a forward surge at the commencement of the induction, while the other wave which reaches the valve as it closes, or preferably just before it closes, will temporarily raise the pressure of supply and will assist in the compression of the fresh charge. The portion of this wave which passes through the inlet valve will be incorporated into the much more intense combustion wave.

Figure 10:
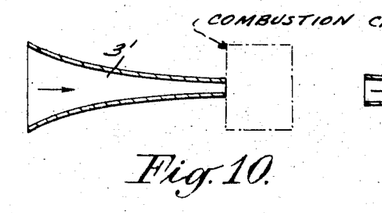
Figures 10 and 11 show two forms of inlet duct.
Figure 11:
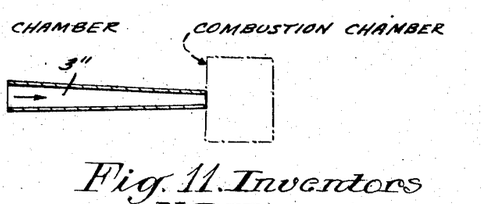

Figures 10 and 11 show two convenient forms of inlet duct, the one 3' shown in Figure 10 being particularly suitable for taking advantage of the velocity head due to forward motion of the machine, while the inlet duct 3" shown in Figure 11 is more suitable for a stationary machine. If the induction period occupies 50 per cent. of the cycle, the length of the inlet duct will be half the length of the closed portion of the wave duct, in order to give a positive pulse at the opening and closing of the induction valves. If the induction period occupies two thirds of the cycle, the length of the inlet pipe will be two thirds and so on. Alternatively the length of the inlet duct could be made in sub-multiple of the above figures, and in these cases there would be more than one vibration in the inlet pipe during the induction period, but there would still be a positive pulse at the opening and closing of the inlet valve. In all cases it will be appreciated that if the generator is used for direct jet propulsion no tailpipe need be fitted.

As already stated the fresh charge may be a carburetted mixture of fuel and air, in which case the control of the quantity of combustible mixture supplied can be by a variable jet, the air quantity remaining constant, or by a throttle valve. The arrangement is suitable for burning weak mixtures and the fuel may be liquid, gaseous or solid (powder).

If the fresh charge is air, into which the fuel requires to be injected in timed sequence, the injection of fuel must be controlled. A suitable method of control is by a pressure sensitive means, such as a small piston in communication with the combustion chamber, whereby injection occurs when a predetermined minimum pressure is attained in the combustion chamber, or at any other suitable part of the system. In this way, when the reflected positive wave reaches the inner end of the combustion chamber, and the double reflection causes a considerable and rapid rise in pressure, the pressure sensitive means would operate to start the injection.

For example, the pressure gases may actuate a normal fuel injection pump through a small piston, as described in relation to Figure 3. Alternatively the fuel may be raised to injection pressure by a separate pump, and the pressure sensitive means can be arranged to start injection, with the duration of the injection controlled by any means, mechanical, electrical, or hydraulic, which, when actuated, will function for a predetermined and adjustable interval, and then stop until again actuated in the same manner.

Means sensitive to the direction and intensity of the motion of the wave may be used in place of the pressure sensitive means, and the pressure or direction sensitive means may be manually or automatically adjustable.

Alternatively the minimum operating pressure of the said means may be continuously and automatically reset as a function of the maximum pressure of the previous cycle.

If ignition means, such as a sparking plug, is used, the timing of the spark may be controlled by means similar to those described for controlling the injection of fuel.

As an alternative to spark ignition, autoignition may be used, since ignition does not require to be precisely related to the position of a moving piston or other mechanism, while the relatively uncontrolled pressure rise can have no harmful effects in the absence of moving mechanical parts.

This method of ignition, in conjunction with a carburetted mixture as fuel, provides an extremely simple generator, with a minimum of auxiliary equipment.

Alternatively the compression ignition or diesel method may be used, and the compression pressures attained by the reflected positive wave can readily be made adequate to ensure satisfactory combustion and operation by this method, even if fuels of low ignition quality are used.

The inlet valves may be automatically operated, by the pressure difference between the ambient atmosphere and the low pressure created in the combustion chamber by the negative waves. The valves should be as light as possible, consistent with sufficient strength to withstand the maximum combustion pressure. If poppet type valves are used the stems may be short and light, as the latter are required for guiding purposes only, there being no actuating loads or side thrusts.

The stop for the fully open position of the valve may be provided by webs inside the combustion chamber, and acting on the valve head, to avoid adding weight to the valve stem.

A multiplicity of valves, having a small lift is preferred.

The closing of the valve will be effected by the reflected positive wave, but this action will be intense and would close the valve violently, with consequent severe hammering of the valve face and seat. This detrimental action may be avoided by arranging that the main reflected wave is preceded by a more gentle pressure rise, reflected from a small reflecting surface placed nearer the combustion chamber than the main reflecting surface, or from a converging portion of the wave duct (see Figure 7).

An inlet valve may be used, in certain cases, as the pressure sensitive means. For example, if an electrical contact is to be made, or a control actuated in the fuel line, the inlet valve can perform this action when it closes. In this way, ignition or the commencement of injection of fuel, can be timed to occur as soon as the inlet valve has been closed by the returning pressure wave, which is a suitable timing for the start of combustion.

If it is desired to use positively operated valves, they may be controlled by means similar to those described for the injection system. If desired a pressure sensitive means may control the opening of the valve, while the closing is automatically effected by the rise in pressure of the gases due to compression.

Very large masses of gas can be utilised in the combustion process of generators according to the invention, and increase in size of the generator involves little extra structural costs. There is really no exact line of demarcation between the combustion chamber and the wave duct, and if fresh charge occupies the inner end of the duct, and if combustion continues during the early portion of the propagation of the combustion wave along the duct, this will not seriously affect the efficiency of the generator, provided the desired pressure phases are maintained.

Combustion will take place, even in this case, under high compression.

Fuel can only be lost or wasted if it is discharged in an incompletely burned condition from the open end, and this is extremely unlikely to occur with the present method.

In jet propulsion units, the absence of a compressor, and in certain cases, a turbine, together with other simplifications, enables a large unit or a multiplicity of small units of high power output, to replace the existing power units and effect a considerable saving in weight or increase in power. These considerations apply whether the whole mass of gas is applied to the jet or whether a proportion of the output is used to actuate a turbine driven propeller and only the remainder is applied to the jet, or the exhaust from the turbine is applied to the jet.

In these applications, arrangement of the shape and form of the wave duct enables a large mass of gas, at any desired pressure and velocity, to be available at the jet.

Various methods of ensuring self-induction of the fresh charge have been described, whereby the pressure difference between the ambient pressure and the low pressure established in the combustion chamber by the negative wave actions, is utilised to effect re-charging.

If in any particular installation, it is found that the said pressure difference is insufficient to effect the degree of re-charging required, in the charging time available, as for example, when working at very high frequency, a compressor may be used without detriment or modification to the cycle described. The negative wave actions will ensure a low pressure in the chamber during the charging period, so that the compressor will not require to deliver fresh charge at the full compression pressure, as in certain known generators. A low pressure blower, therefore, may be used in the known manner.

Figure 4:
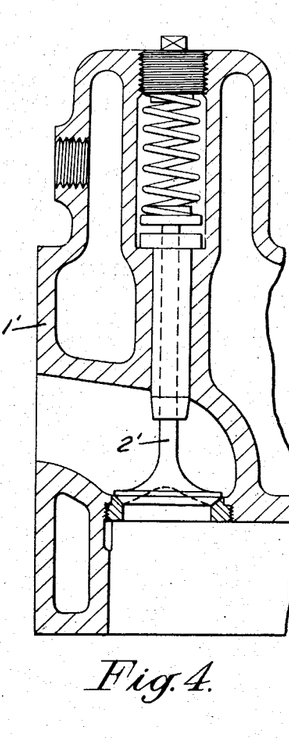
Figure 4 is a view illustrating a detail.

One convenient form of discharge valve is shown in Figure 4, the valve 2' being mounted in an end cover 1' generally such as is shown in Figure 1, and taking the place of one of the four inlet valves 2 shown in that figure. Adequate provision for water cooling of the end cover itself, the valve seat, valve guide and valve spring is shown in Figure 4.

With this arrangement, when combustion occurs, a portion of the combustion wave will be propagated outwards along the divergent wave duct, the negative reflections from the latter effecting induction of the fresh charge. This wave will be positively reflected at the closed end and will return to effect compression for the next cycle. The other portion of the wave, with its energy and gases, will pass out through the delivery valve and be conducted to a point of utilisation or storage. The rate of discharge of the gases out of the delivery valve, the length of the wave duct, and the timing of the arrival of the negative waves at the inlet valve, must be such that the pressure in the combustion chamber is substantially the ambient pressure before the said negative waves arrive. The delivery pressure, in this case, will be a mean between the maximum combustion pressure and the predetermined minimum opening pressure of the delivery valve, or the reservoir pressure.

If the delivery is into an empty or low pressure reservoir, the delivery valve must be spring loaded, or otherwise urged to the closed position, sufficiently to allow a satisfactory compression pressure to be built up by the returning positively reflected wave, and ensure good combustion.

If desired this loading may be reduced as the reservoir pressure increases, for example, by allowing the reservoir pressure to act on a piston connected to the delivery valve, so that the total load on the discharge valve is never much in excess of that required to permit satisfactory compression. The reservoir pressure may exceed the required compression pressure.

Gases at various pressures can be obtained by placing a discharge valve (similiar to that shown in Figure 4) at any distance along the wave duct, which gives the required mean pressure of the discharged combustion products.

If it is desired to compress air to only a small amount above the ambient, such as may be required for charging or scavenging an internal combustion engine, only a small proportion of the total air charge will be required for combustion, and the resultant dilution of the air will be so slight that the mixture will be satisfactory for the said purposes. In this case the compressed air may be delivered directly to the engine. A relatively small open end and a considerable taper or divergence of the wave duct will be necessary to ensure satisfactory compression pressures.

According to a further embodiment of the invention, the generator may be used as an air compressor, by providing an additional duct or ducts in communication with any part of the generator where pressures above and below the ambient occur, said additional ducts being provided with inlet and outlet valves.

When the sub-ambient pressure or suction phase occurs, air is drawn into the additional duct through the inlet valve, and when the super-ambient or pressure phase occurs, the air is compressed and delivered through the delivery valve. The mean delivery pressure and the quantity of air aspirated depend upon the cyclic pressures at the selected point of connection.

If pure air is required, the length of the additional duct must be such that, during the pressure phase exhaust gases do not reach the delivery valve. This arrangement ensures that the inlet and delivery valves operate under cool conditions.

The additional duct may be in communication with the combustion chamber, and the total fresh charge, including that required for combustion, may be induced through the inlet valve at the outer end of the additional duct, so that the inlet valve in the combustion chamber becomes unnecessary. In this case the addition duct must be of considerable length, depending upon the quantity of fuel burned, otherwise, after the air has been discharged, products of combustion will follow. For many purposes a mixture of air and products of combustion is a satisfactory medium for operating a driven unit, which cannot utilize very high temperature gases. The products of combustion discharged from the open end, if at suitable pressure, may be added to the same reservoir.

Figure 5:
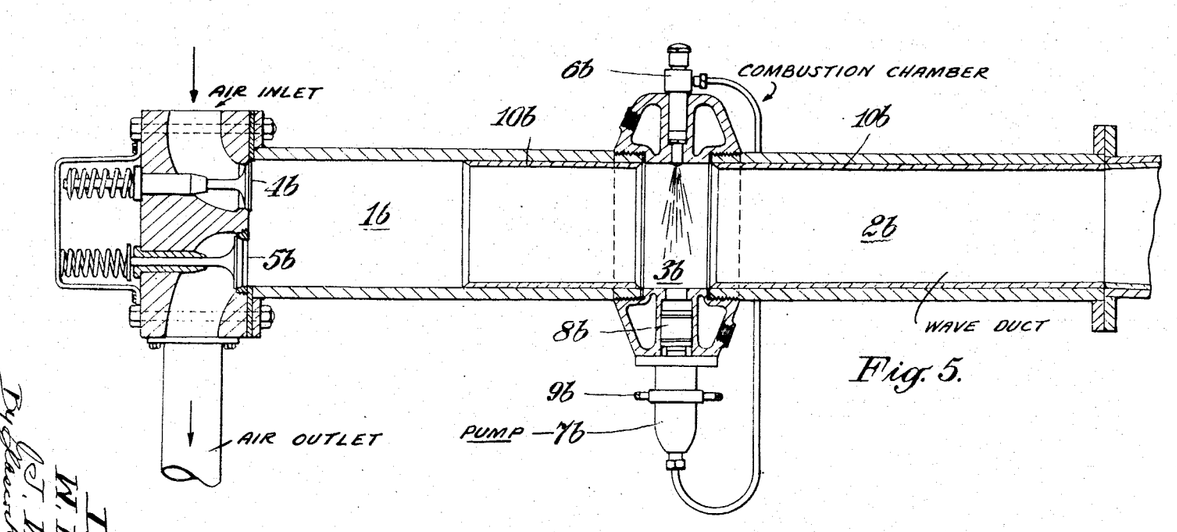
Figure 5 shows a further form of apparatus in accordance with the invention.

For example, the additional duct may be arranged in axial alignment with the wave duct, and on the opposite side of the combustion chamber, one such arrangement being shown in Figure 5. In this arrangement a duct 1b is placed in axial alignment with the main wave duct 2b, but on the other side of the combustion chamber 3b, and is provided with inlet 4b and discharge valves 5b for the induction and discharge of air, a small part only of which takes part in the combustion process, this part being discharged at the far end of the duct while pure air is delivered under pressure through the delivery valve 5b. For clearness only one inlet valve is shown, but two others may be arranged as in Figure 1, or alternatively two valves may be provided for induction and two for discharge. Both inlet and discharge valves are of the light automatic spring loaded type.

The combustion chamber portion 3b is provided with an injector 6b, and an injection pump 7b and actuating piston 8b as described for Figure 3. In both Figures 3 and 5, the injection pump and the nozzle holder are shown opposite one another so that both may be included in the same view, but it will generally be desirable to place them closer together and avoid a long injection pipe, unless the latter is required to provide a delay action. Control of the fuel quantity is by means of the rack 9b of the conventional type injection pump. The combustion chamber unit is watercooled. The main wave duct and a portion of the extension are lined with a heat insulating material 10b.

In this arrangement the length and volume of the additional duct should be such that when the fresh charge is compressed it is substantially contained in the said additional duct and the combustion chamber. In other words the excess air charge, over that contained in the normal combustion chamber, is to the inlet side of the chamber.

When combustion occurs the wave moves outwardly in both directions along the wave duct for the purposes already described, and in the opposite direction to compress the excess air charge and deliver it out of the delivery valves into a suitable container or reservoir. The length of the combustion wave will be increased, as compared with the embodiments previously described, since the wave has some distance to travel before being reflected from the outer end of the additional duct, and has then to pass along the wave duct. The adjustment of the delivery valve may be as previously described.

It should be appreciated that the movement of the energy forming the wave is quite distinct from, and more rapid than, the movement of the gases. The gases move outwardly until their pressure falls to the pressure through which the wave has moved, while the energy continues to move through the previously inert medium until it is reflected. In this way the movement of the burnt gases along the additional wave duct can be arranged to be such that the gases do not reach the delivery valve, or do so after their pressure has fallen below the minimum opening pressure of the delivery valve, while the wave, proceeding ahead of the gases, compresses the air and delivers it through the valve at relatively high pressure, preferably leaving the small quantity of air in the additional duct.

The fuel supplying and ignition means will be placed towards the wave duct end of the combustion chamber in the zone where combustion is desired. A carburetted mixture may be used with this embodiment, by providing an inlet valve in the side of the combustion chamber and communicating with a carburetor. The negative waves will effect satisfactory induction through both valves under these conditions.

We claim:

1. A generator for producing a supply of gases under pressure, comprising means defining a combustion chamber, inlet valve means for the introduction of charges of gas into the chamber, mixing means for mixing a combustible fuel with said gas to form successive charges of combustible mixture in said chamber, ignition means for said mixture, wave duct means communicating with said chamber and having first and second wave reflecting means for reflecting combustion-produced compression waves travelling along said duct means away from said chamber and thereby to return them to said chamber, said first wave reflecting means being disposed at a point along said duct means so as to reflect a portion of said compression waves to said chamber as waves of rarefaction, said second wave reflecting means being disposed at a point further along said duct means from said chamber so as to reflect a portion of said compression waves to said chamber as waves of compression, and exhaust means for the exit of gases from said generator.

2. A generator in accordance with claim 1, in which said inlet valve means comprises a gaseous pressure-operated valve, and in which said mixing means comprises a carburetor.

3. A generator in accordance with claim 1, in which said mixing means comprises a fuel injection system.

4. A generator in accordance with claim 3, and pressure-operated means communicating with said chamber for operating said fuel injection system.

5. A generator in accordance with claim 1, in which said wave duct means has a part of constant cross-sectional area adjacent said chamber and a part which increases in cross-sectional area with increase of distance from said chamber, the last-named part constituting said first reflecting means, and a plate at least partially closing said duct and constituting said second reflecting means.

6. A generator in accordance with claim 1, in which said wave duct means comprises a pair of wave ducts communicating with said chamber on the same side thereof, one of said ducts having a part of constant cross-sectional area adjacent the chamber and a part which increases in cross-sectional area at points of increased distance from said chamber, said latter part constituting said first reflecting means, and the other of said ducts being of constant cross-sectional area and having a closed end constituting said second reflecting means.

7. A generator in accordance with claim 1, in which said wave duct means communicates with said chamber on one side thereof, and a further wave duct communicating with the opposite side of said chamber, said exhaust means comprising a discharge valve in the last-named duct.

8. Generator for producing a supply of gases under pressure comprising means defining a combustion chamber, inlet valve means for the introduction of charges of gas into the chamber, mixing means for mixing a combustible fuel with said gas to form successive charges of combustible mixture which are caused to ignite and undergo combustion within said chamber, a wave duct communicating with said chamber comprising two parts, the one part adjacent said combustion chamber being of constant cross-sectional area throughout its length while the other part is a continuation of the first part and has increased cross-sectional area at an increased distance from the chamber, and a plate partly closing that end of the latter duct part which is remote from the chamber, the length of each of the two parts being half the length of the compression wave travelling along each part of said duct away from the chamber resulting from said combustion, and exhaust means for the exit of gases from the generator.

9. A generator in accordance with claim 1, in which said ignition means comprises an electrical spark ignition device, and pressure-operated means communicating with said chamber for controlling the circuit to said device.

10. A generator in accordance with claim 1, in which said inlet valve means comprises a piston moving in a part of said chamber, and means responsive to gaseous pressure in said wave duct means for moving said piston.

WILFRED PERCIVAL MANSFIELD.
    JOHN WHITE.

References Cited in the file of this patent

UNITED STATES PATENTS

| Number | Name | Date |
|---|---|---|
| 1,021,521 | Héroult | Mar. 26, 1912 |
| 2,102,559 | Kadenacy | Dec. 14, 1937 |
| 2,106,427 | Hansson | Jan. 25, 1938 |
| 2,167,303 | Kadenacy | July 25, 1939 |
| 2,206,193 | Kadenacy | July 2, 1940 |
| 2,207,936 | Nardone | July 16, 1940 |
| 2,425,121 | Peterson | Aug. 5, 1947 |
| 2,427,845 | Forsyth | Sept. 23, 1947 |
| 2,463,820 | Stafford | Mar. 8, 1949 |
| 2,480,540 | Bodine | Aug. 30, 1949 |
| 2,503,584 | Lipkowski | Apr. 11, 1950 |
| 2,520,751 | Zucrow | Aug. 29, 1950 |
| 2,523,379 | Kollsman | Sept. 26, 1950 |
| 2,546,966 | Bodine | Apr. 3, 1951 |

FOREIGN PATENTS

| Number | Country | Date |
|---|---|---|
| 27,724 | Great Britain | Dec. 16, 1907 |
| 176,838 | Great Britain | Mar. 6, 1922 |
| 308,595 | Great Britain | Aug. 18, 1930 |
| 386,908 | Great Britain | Jan. 26, 1933 |
| 424,955 | Great Britain | Dec. 1, 1933 |
| 412,478 | France | May 3, 1910 |
| 626,976 | France | May 28, 1927 |